United States Patent [19]

Howe et al.

[11] Patent Number: 4,694,781
[45] Date of Patent: Sep. 22, 1987

[54] CONTAINER FOR ATTACHMENT TO ANIMAL EAR TAGS

[76] Inventors: Steve R. Howe, 27 University Dr., Longmont, Colo. 80501; William B. Warner, 2338 W. Rockwell Ct., Chandler, Ariz. 85224; J. Wallace Shores, 10202 N. 51st Dr., Glendale, Ariz. 85302

[21] Appl. No.: 802,961

[22] Filed: Nov. 29, 1985

[51] Int. Cl.[4] .................. G09F 3/00; A01K 13/00
[52] U.S. Cl. ................................ 119/156; 40/301
[58] Field of Search ............. 119/156; 40/301, 302, 40/300

[56] References Cited

U.S. PATENT DOCUMENTS

| Re. 31,940 | 7/1985 | Ritchey | 119/156 |
|---|---|---|---|
| 3,405,688 | 10/1968 | Gerhardi | 119/156 |
| 3,756,200 | 9/1973 | Ohlhausen | 119/156 |
| 3,935,839 | 2/1976 | Goodwin | 119/156 |
| 3,942,480 | 3/1976 | Hair et al. | 119/156 |
| 3,949,708 | 4/1976 | Meeks | 119/156 |
| 4,023,532 | 5/1977 | Goodwin | 119/156 |
| 4,059,074 | 11/1977 | Fürer | 119/156 |
| 4,184,453 | 1/1980 | Ritchey | 119/156 |
| 4,359,015 | 11/1982 | Ritchey | 119/156 |
| 4,366,777 | 1/1983 | Akhavein et al. | 119/156 |
| 4,425,874 | 1/1984 | Child | 119/156 |
| 4,428,327 | 1/1984 | Steckel | 119/156 |
| 4,495,898 | 1/1985 | Akhavein et al. | 119/156 |
| 4,506,630 | 3/1985 | Hair | 119/156 |
| 4,597,208 | 7/1986 | Chevillot | 40/301 |

FOREIGN PATENT DOCUMENTS 8102068 11/1982 Netherlands .......................... 40/301

*Primary Examiner*—Robert Peshock
*Assistant Examiner*—John G. Weiss
*Attorney, Agent, or Firm*—LaValle D. Ptak

[57] ABSTRACT

An improvement for use with a conventional ear identification tag of the two-part type where a "button" is inserted through the ear of the animal to engage a "boss" from which a depending identification tag is attached comprises a press-fit retaining ring attached to a hollow housing for attachment over the boss of the ear identification tag. The housing may be used to house and dispense insecticide, insect repellents, drugs and the like, or it may be used to house a miniature radio transmitter or transceiver of the type frequently worn by animals, such as dairy cattle. The housing and/or the attachment means may be made of frangible material to permit quick removal when the material in the housing is used up or no longer is necessary, or where replacement with a new housing filled with insecticide, insect repellent, drugs, or the like is desired.

12 Claims, 7 Drawing Figures

CONTAINER FOR ATTACHMENT TO ANIMAL EAR TAGS

BACKGROUND

Identification animal ear tags for cattle, hogs and the like are in widespread use. The most popular forms of these tags comprise two components formed of plastic or similar resilient material. A first component has a back-up button with a spike of hard plastic material projecting from its center. The second component, which generally carries the identification indicia, has a boss with a hole in it for receiving the spike after it is pressed through the ear of the animal. The spike then is seated in the box to secure the ear tag to the animal's ear. Typically, such tags are such made in different colors to provide identifying information concerning the animal wearing a tag of a particular color. In addition, numbers or letters or other indicia are provided on the tags to permit accurate identification of each particular animal in a herd.

As ear indentification tags for animals are increasingly used, various techniques also have been devised for using such tags to release insecticides, insect repellent or animal repellents, either through separately applied tags or by adding a carrier of some type to the identification ear tag.

One concept for combining an identification feature and an insecticide feature is disclosed in the patent to Ritchey U.S. Pat. No. 3,184,453. In Ritchey, the tag itself is made of a material impregnated with an insecticide which bleeds out over a period of time to provide control over flies and other insects that may come near the animal's ear. The problem with the use of an impregnated identification tag is that within a relatively short period of time the insecticide is used up. If continued insect control is desired, the ear tag itself must be removed and replaced with a new tag. This is time consuming and requires the formation of another hole in the animal's ear to reapply a new identification/insecticide tag.

Some other approaches to combining the functions of identification and insect control without the necessity of replacing the identification tag when the insecticide needs replacing are disclosed in the patents to Furer U.S. Pat. No. 4,059,074; Hair U.S. Pat. No. 4,506,630; Akhavein U.S. Pat. No. 4,495,898 and U.S. Pat. No. 4,366,777; Steckel U.S. Pat. No. 4,428,327; and Meeks U.S. Pat. No. 3,949,708. In the Furer patent a separate disc made of a carrier impregnated with insecticide is made to slide over the pin of the ear tag. When the insecticide is used up, the disc must be pulled off the pin (by aligning a slot in it with the pin), and then a new disc may be palced over the pin. This is a cumbersome operation. The Akhaven patents disclose insecticide carriers which are wrapped around a portion of the tag to fasten upon themselves. Removal and installation of these carriers is cumbersome.

The Meeks, Steckel and Hair patents all are directed to replenishable insecticide devices for use with ear tags, but the tags themselves are of special construction to accommodate the different insecticide dispensers disclosed in these patents.

Another prior art approach to providing insect control for animals has been to utilize an insect dispenser which is separate from any identification tag and which also is applied to the ear of the animal. A variety of different techniques for accomplishing such insect control are disclosed in the patents to Goodwin U.S. Pat. No. 4,023,532; Hair et al U.S. Pat. No. 3,942,480; Goodwin U.S. Pat. No. 3,935,839; Ohlhausen U.S. Pat. No. 3,756,200; Gerhardi U.S. Pat. No. 3,405,688; Child U.S. Pat. No. 4,425,874; and Ritchey U.S. Pat. No. R. 31,940. All of the patents of this group are directed to devices for dispensing insecticide at the ear of the animal. Some of the devices are attached to the ear by piercing the ear in a manner similar to the technique used for attaching identification tags. Others of the devices are placed inside the ear or are wrapped around a portion of the ear. In all cases, the dispensers are somewhat cumbersome and difficult to replace when the supply of insecticide must be replenished.

Accordingly, it is desirable to provide a container which may be used in conjunction with insecticides, insect repellents or other materials, and which may be used in conjunction with a standard unmodified ear identification tag. It further is desirable to provide such a container which is easy to apply and which is readily replaceable without requiring any additional holes in the animal's ear.

SUMMARY OF THE INVENTION

Accordingly it is an object of this invention to provide a container which is attached to a conventional animal ear identification tag.

It is another object of this invention to provide a container which attaches to the boss of a conventional animal ear identification tag.

It is an additional object of this invention to provide a container for attachment to a conventional animal ear tag which is easy to apply and to remove.

It is a further object of this invention to provide an improved liquid or solid dispensing container for use in conjunction with conventional ear identification tags.

It is an additional object of this invention to provide an improved easy-to-apply and easy-to-remove container for attachment to the boss of an unmodified conventional animal ear identification tag.

In accordance with a preferred embodiment of this invention, a container has been developed for use with an animal ear identification tag. A standard animal ear identification tag has at least two parts, comprising a backing portion with an elongated spike for passing through the ear of the animal and a tag portion having a hollow boss for receiving and holding the spike after passage of the spike through the animal's ear. An attachment device for the container is placed over and in engagement with the boss of the ear tag portion of the identification tag; so that the attachment device is secured to the boss. A housing is coupled to the attachment device. This housing may be used to hold insecticide, insect repellent, drugs or other devices as desired.

DETAILED DESCRIPTION

Figure 1:
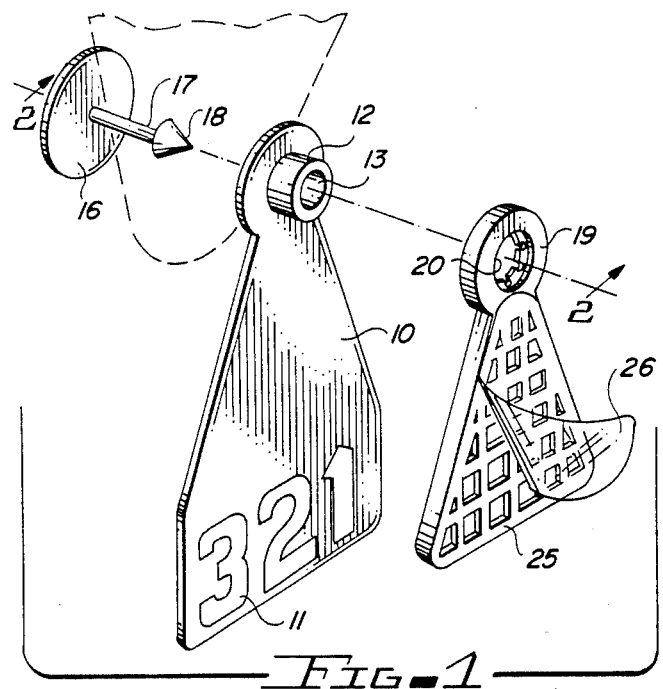
FIG. 1 is a front perspective view of a preferred embodiment of the invention.

Reference now should be made to the drawing in which the same reference numbers are used throughout the different figures to designate the same or similar components. Two embodiments are illustrated in the drawing. The first of these embodiments is shown in FIGS. 1 through 4.

Figure 2:
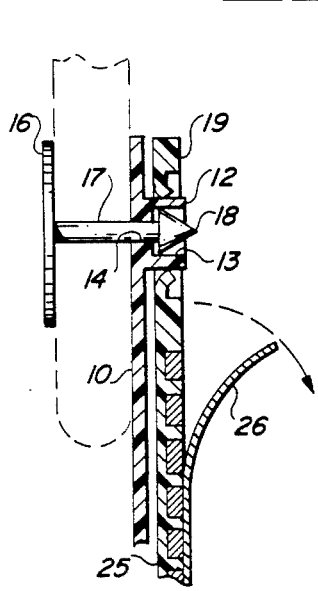
FIG. 2 is a cross-sectional view of a portion of the embodiment shown in FIG. 1.

In the embodiment illustrated in FIGS. 1 through 4, a conventional two-piece livestock identification ear tag 10 of the type which is commonly used to provide an identification number 11 (or other useful indicia) is illustrated. On its upper end, such a conventional tag 10 has a circular boss 12 with an internal enlarged opening 13 at its outer or right-hand end as viewed in FIG. 1. This opening 13 communicates with a smaller opening 14 (best seen in FIG. 2) which passes through the main body portion 10 of the ear tag. To attach this conventional tag 10 to the ear of an animal, an attachment button 16 having an elongated shaft 17 terminating in a flared, pointed tip 18 is passed through the ear of the animal and through the hole 14 to seat the tip 18 in the opening 13 of the boss 12. This is illustrated in FIG. 2, which shows the ear of the animal in dotted lines.

The structure which has been described thus far is a conventional widely used livestock identification ear tag. Normally such a tag simply provides the function of identifying the animal, much in the manner of a brand, and for a particular herd by providing the animal with a specific identification number such as illustrated in FIG. 1. To this tag, an insecticide dispensing container 25 is attached to the boss 12 by pressing a ring 19 at the upper end of the container 25 over the boss so that the an internally toothed locking washer portion 20 tightly grips the outer edge of the boss 12 as illustrated most clearly in FIG. 2.

The container portion 25 includes a number of waffle-like indentations which may be filled with an insecticide, insect repellant, medication, or the like and then covered over with a thin plastic sealing sheet 26. The material which is placed in the indentations in the body 25 and thematerial of the body 25 of the container are selected to be such that the material in the various chambers slowly passes through or oozes through the material of the body 25 and the sealing sheet 26 to dispense from the container 25 onto the ear tag 10. In the normal course of the movements of an animal wearing the ear tag 10, the insecticide or other material which is passed out of the container 26 onto the ear tag 10 is rubbed off onto the animal wearing the tag or onto another animal with which the tagged animal comes into contact. To continuously dispense the insecticide so that it may serve its intended purpose.

When the insecticide which has been placed in the waffle-like identations of the container 25 is used up, the container 25 may be removed from the boss 12 of the ear tag 10 and thrown away. Then a new container 25 may be placed on the boss 12 to continue dispensing insecticide without requiring any removal or modification whatsoever of the conventional ear tag 10.

Figure 3:
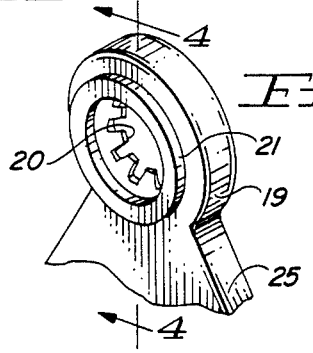
FIG. 3 is a rear prespective detail view of a variation of the embodiment shown in FIG. 1.
Figure 4:
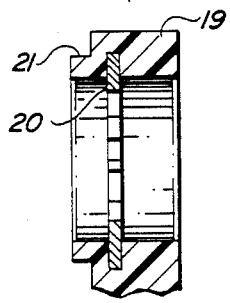
FIG. 4 is a cross-sectional view taken along the line 4—4 of FIG. 3.

As illustrated in FIGS. 1 and 2, the inner toothed portion or locking washer portion 20 of the device is integrally formed from the same material as the main body portion 25. Ideally however, the body portion 25 should be somewhat flexible; whereas, for maximum holding ability, the locking washer teeth 20 shoule be made of relatively rigid material. Consequently, a modified construction as illustrated in FIGS. 3 and 4 is preferred. In this construction the locking washer 20 is a separate part held in place in the upper end 19 of the container 25 in an internal groove, which is spaced inwardly by means of a shoulder portion 21. When this structure is utilized, the upper portion 19 and the main body portion of the container 25 may be made of a relatively flexible "rubber-like" plastic and the locking ring 20 may be made of a rigid plastic or of metal. Since the boxx 12 of conventional cattle ear tags also is made of a relatively flexible plastic, the use of rigid plastic or metal for the locking ring 20 causes the teeth on the locking ring 20 to tightly grip the boss 12; so that accidental removal of the container 25 from the ear tag 10 is much less likely than with the embodiment which was described in conjunction with FIGS. 1 and 2.

When removal of a container 25 using a separate retaining ring 20 fo the type shown in FIGS. 3 and 4 if desired, this most readily is accomplished by squeezing the upper portion 19 of the body 25 with a pair of pliers. If a brittle or frangible plastic insert 20 is used it will shatter. If a metal locking washer is used it will be badly distorted to permit easy removal of the used container 25. Replacement with a new container 25 then is accomplished simply by pressing the locking ring 20 of the new container over the boss 12 in the manner described previously.

Figure 6:
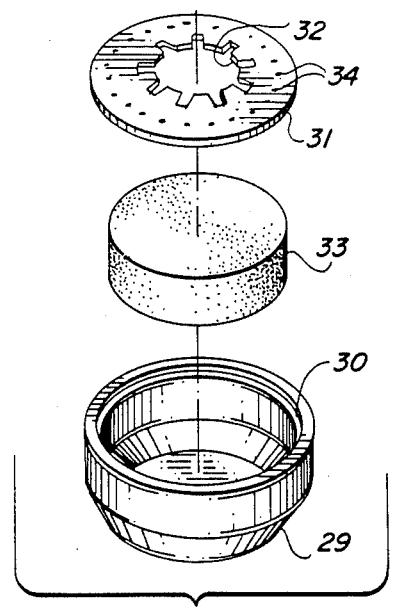
FIG. 6 is an exploded view of the embodiment shown in FIG. 5.
Figure 7:
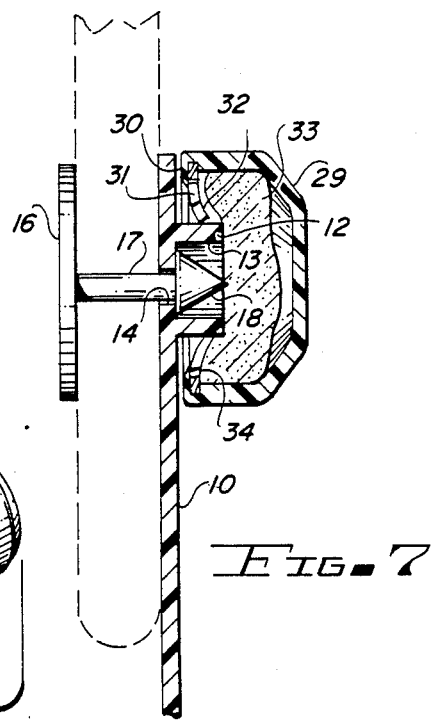
FIG. 7 is a cross-sectional view of the embodiment shown in FIGS. 5 and 6 illustrating the manner of use.
Figure 5:
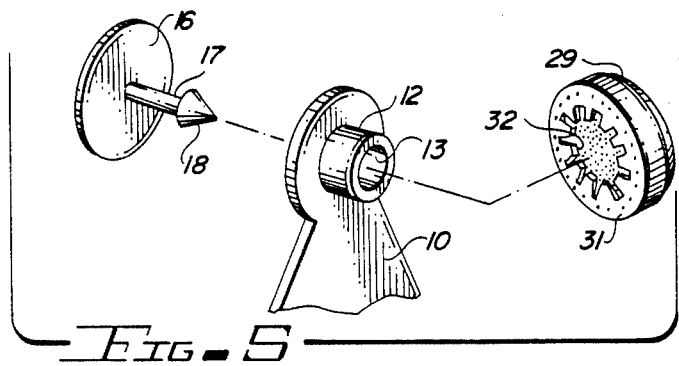
FIG. 5 is an exploded perspective view of the manner of application of another preferred embodiment of the invention.

Another embodiment of the invention is illustrated in FIGS. 5 through 7. In this embodiment, the same ear tag structure 10 is illustrated. Instead of using a dangling type of container or housing 25, however, of the type used in FIGS. 1 through 4, a "button-like" housing container 29 is employed and is carried directly over the boxx 12 of the ear tag 10. The housing 29 is closed at its open end by a locking washer 31 with internally formed teeth 32. The washer 31 is similar to the locking washer or locking member 20 of FIGS. 1 through 4. The locking washer 31 fits inside a groove 30 in the open end of the container 29 which faces the ear tag 10 when the assembly is placed over the boss 12.

In use, the embodiment shown in FIGS. 5 thorugh 7 has a felt disc or sponge insert 33 saturated with liquid insecticide, insect repellent, or other liquid or solid first placed in the container 29. After the saturated felt or sponge insert 33 is placed in the container 29, a rigid plastic (or metal) locking washer 31 is pressed to fit in the groove 30. This holds the insert 33 in place and generally seals off the open end of the container 29. A number of small holes 34, however, are provided in the locking washer 31; and, obviously some spaced also exist between the adjacent teeth 32 of the locking washer 31.

The container 29, with the locking washer 31 pressed in place behind the lip of the groove 30, is pressed onto the boss 12 as illustrated in FIG. 7. This causes a distortion of the teeth 32 of the locking washer 31 to firmly hold the locking washer in place and therefore hold the container 29 in place on the boss 12 of the ear tag 10. The liquid in the saturated felt washer 33 then oozes through the holes 34 and the spaces between the adjacent teeth 32 onto the ear tag 10, from which its passes onto the animal in the manner described previously to accomplish its desired purpose. If a powdered solid insecticide or medicine is placed in the container 29, the powder drops through the holes 34 and spaces between the teeth 32 onto the ear tag 10.

As in the case of the embodiment illustrated in FIGS. 3 and 4, removal of the container 29 is accomplished by squeezing it with a pair of pliers to crush the locking washer/ring 31. Once this has been accomplished, the button-like housing 29 falls away or easily may be pulled off the boss 12; so that it can be replaced with a fresh housing 29 if desired.

Although the foregoing description has been directed to containers for dispensing insecticides, the container of the embodiment shown in FIGS. 5 through 7 also could be used to hold other materials such as identification transponders, anthelmintics, externally applied medications, radio transmitters/receivers and the like. The particular type of material which is held in the housing container 29 is not important; although the container 29 most likely will be used primarily to dispense insecticides and liquid medications. The ability to dispense insecticides permits high insecticide loading compared to conventional tags of the monolithic type where the high polymer to insecticide ratios of such monolithic tags make the uses of most toxicants impractical.

Although different embodiments of the invention have been illustrated in the various figures of the drawings, these embodiments are to be considered as illustrative of the invention and not as limiting. Various changes and modifications will occur to those skilled in the art without departing from the true scope of the invention as defined by the claims.

We claim:

1. For use with an animal ear identification tag having at least two parts comprising a backing portion with an elongated spike for passing through the ear of the animal and a tag portion with a hollow hoss for receiving and holding said spike after passage of the same through the ear of the animal, a container including in combination:
    attachment means made of frangible material for press fit frictional engagement with the boss of said tag portion to permit relatively easy placement over said boss whereby said attachment means is secured to said boss and said attachment means being structured to break upon removal from said boss; and
    hollow housing means coupled to said attachment means.

2. The combination according to claim 1 wherein said attachment means is a retaining ring.

3. The combiantion according to claim 1 wherein said attachment means and at least a portion of said housing means are integrally formed as a single part.

4. The combination according to claim 1 wherein said housing means extends downwardly from said attachment means to overlie a predetermined portion of the tag portion of said ear identification tag.

5. For use with an animal ear identification tag having at least two parts comprising a backing portion with an elongated spike for passing through the ear of the animal and a tag portion with a hollow boss for receiving and holding said spike after passage of the same through the ear of the animal, a container including in combination:
    a retaining ring having openings for permitting the passage of fluid and solid materials therethrough for placement over and in engagtement with the boss of said tag portion whereby said retining ring is secured to said boss; and
    hollow housing means coupled to said retaining ring; whereby fluid and solid materials placed in said housing pass through openings in said retaining ring to flow outwardly therethrough onto to tag portion of said ear identification tag.

6. The combination according to claim 5 wherein said materials are insecticides.

7. The combination according to claim 5 wherein said materials are insect repellents.

8. The combination according to claim 5 further including a liquid absorbent insert impregnated with liquid placed in said housing for controlling the flow of fluid therefrom through openings in said retaining ring over a prolonged period of time.

9. The combination according to claim 8 wherein said insert comprises an insert saturated with a predetermined liquid.

10. The combination according to claim 5 wherein said housing means extends downwardly from said attachment means to overlie a predetermined portion of the tag portion of said ear identification tag.

11. For use with an animal ear identification having at least two parts comprising a backing portion with an elongated spike for passing through the ear of the animal and a tag portion with a hollow boss for receiving and holding said spike after passage of the same through the ear of the animal, a container including in combination:
    attachment means for placement over and in engagement with the boss of said tag portion whereby said attachment means is secured to said boss;
    housing means coupled to said attachment means; and
    a liquid absorbent insert impregnated with liquid placed in said housing for controlling the flow of fluid therefrom through openings in said attachment means over a prolonged period of time.

12. The combination according to claim 11 wherein said insert comprises an insert saturated with a predetermined liquid.

* * * * *